United States Patent [19]

Crystal

[11] Patent Number: 5,662,734
[45] Date of Patent: Sep. 2, 1997

[54] INK COMPOSITIONS HAVING IMPROVED OPTICAL DENSITY CHARACTERISTICS

[75] Inventor: Richard G. Crystal, Los Altos, Calif.

[73] Assignee: Graphic Utilities, Inc., Concord, Mass.

[21] Appl. No.: 558,143

[22] Filed: Nov. 13, 1995

[51] Int. Cl.$^6$ .................................................. C09D 11/02
[52] U.S. Cl. .................... 106/31.75; 106/31.78; 106/31.86
[58] Field of Search ...................... 106/20 R, 23 H, 106/20 D

[56] References Cited

U.S. PATENT DOCUMENTS

| | | | |
|---|---|---|---|
| 4,171,983 | 10/1979 | Farmer, III et al. | 106/23 H |
| 4,810,292 | 3/1989 | Palmer et al. | 106/22 B |
| 5,106,417 | 4/1992 | Hauser et al. | 106/20 R |
| 5,220,346 | 6/1993 | Carreira et al. | 106/20 R |
| 5,221,334 | 6/1993 | Ma et al. | 106/20 D |
| 5,324,349 | 6/1994 | Sano et al. | 106/20 R |
| 5,338,597 | 8/1994 | Kurabayashi et al. | 106/20 R |
| 5,364,462 | 11/1994 | Crystal et al. | 106/22 R |
| 5,431,720 | 7/1995 | Nagai et al. | 106/20 R |

OTHER PUBLICATIONS

Product Information Sheet, Croda Inc., 7 Century Drive, Parsippany, NJ 07054–4698, 4 pages, no date available.
Product Information Sheet, Croda, Inc., 7 Century Drive, Parsippany, NJ 07054–4698, 1 page, no date available.
Data Sheet, Croda Inc., 7 Century Drive, Parsippany, NJ 07054–4698, Mar. 18, 1988, 3 pages.
Material Safety Data Sheet, Croda Inc., 7 Century Drive, Parsippany, NJ 07054–4698, May 6, 1994, 5 pages.

*Primary Examiner*—Helene Klemanski
*Attorney, Agent, or Firm*—Oblon, Spivak, McClelland, Maier & Neustadt P.C.

[57] ABSTRACT

This invention is directed to improved aqueous pigment-based ink compositions for use in ink jets and methods of enhancing and/or controlling the optical density and print sharpness of both pigment-based and dye-based inks. The improved ink compositions include a class or organic quaternary ammonium compounds which improve the optical density and print sharpness of the inks. Other improvements include the use of a polyalkylene oxide to impedence match the ink with the drop formation rate to provide drop formation rates as high as 8,000 drops per second. These high drop rates permit higher writing speeds and enhanced printer resolution. Yet another improvement to ink jet ink composition is the addition of urea, urea derivatives and thiol compounds. These compounds prevent the ink jet from accumulating dried ink thus preventing clogging of the ink jet.

13 Claims, No Drawings

INK COMPOSITIONS HAVING IMPROVED OPTICAL DENSITY CHARACTERISTICS

TECHNICAL FIELD

This invention relates to improved ink compositions, particularly water-based inks for ink jet printers, and methods of enhancing and/or controlling the optical density of both pigment-type and dye-based inks. The improved ink compositions include a class of organic quaternary ammonium compounds which surprisingly have been found to improve optical density and related properties of the inks making them particularly suitable for use as water-based ink jet type inks, particularly when used in association with viscosity modifiers, humectants and jet orifice foulant retardants.

BACKGROUND

Ink jet printers have rapidly achieved a wide commercial success due to a combination of features, principally low cost, rapid printing speed capability, quiet operation and excellent graphic capability. Jet printing is a non-impact method for forming patterns, which include both typography and graphics in response to computer-generated electronic signals. The signal causes the printer to produce droplets of ink that are project on to a substrate such as paper or plastic film of varying types. A printed image is comprised a multitude of discreet dots laid in an orthogonal pattern. The sharpness of the image in part depends on the size of the dots which in turn are a function, inter alia, of the print head aperture size, and the media (nature and quality of the paper or plastic film substrate, including surface characteristics). The composition and character of the inks also plays a vital part in the image quality, light fastness, resolution, water and smear resistance, and storage stability, among others.

The term ink jet as used herein includes a variety of methods of forming and projecting the dots, including vaporization (so-called bubble jet technology) and hydraulic droplet projection. While first commercial ink jet printers laid down from 1 to 200 dots per inch, they now exceed 700 dpi. Printer inks for ink jet printers are ordinarily of three basic types: pigment-type inks, dye-based inks and toned pigment inks, which employ a combination of dye and pigments. Regardless of the type, they need to have for optimum print head performance and image quality suitable properties of viscosity, stability, drying speed, and surface tension. They also need to retain the water or other solvent in the ink cartridge so that no precipitate or crystals form around the nozzle openings when the printing is interrupted for an extended period of time. Further, the ink viscosity and drying speed should not be so high that the nozzles become clogged by the ink after prolonged nonuse or by clinging to the outer edge of the nozzles causing build-up around the nozzle giving rise to a nozzle port bridge over or irregular edges leading to a ragged dot formation.

Dye-based inks are particularly suitable for ink jet printing because the dye compound is fully soluble in the carrier, typically water or a water/solvent system. However, while dye-based inks are satisfactory for many applications, the dye tends to wick in paper fibers causing the dots to have a feathered edge. The resulting dots do not have the sharp boundaries needed to produce an ultra-high resolution image unless a special media (paper or plastic sheet material) is used. Also, the dyes, unless they become covalently bonded to the media, tend to smear after the printing operation due to water solubility. The contradiction is that the dye compound should be soluble in the water carrier, yet after application and evaporation of the water, the resulting dye should be water fast. These, being contradictory properties, ordinarily results in one property being sacrificed in favor of the other. A good dye-based ink composition is shown in U.S. Pat. No. 5,364,462 to Crystal, et al. of Graphic Utilities, and is particularly directed to improved water solubility and water fastness by use of hydroxyethlated polyethylene imine polymers, and alternate embodiments.

Pigment-type inks, on the other hand, generally produce higher quality images on a wider range of media type and qualities. Properties that are important in this regard include size of the pigment particles, the carrier or vehicle in which the pigment particles are suspended, nonsettling characteristics of the ink composition and the concentration of the pigment in the ink composition. As compared to paints, pigment-based inks are generally of much lower pigment concentration being on the order of 30% as compared to paints which may have a loading on the order of up to 60 to 70%, which in some cases include latex(s) as part of the solids loadings. In part this is due to the nature of the method of application, ink jet printing. Inks with greater loadings exhibit higher viscosity and poor printing qualities due, in part to the fact that there must be a sufficient carrier for the print head to propel the droplet toward the media. Further, high pigment concentrations lead to faster nozzle build-up and plugging. Further, there is a problem with respect to drop out of pigment. When pigment concentrations get too high, they tend to agglomerate due in part to breakdown of the suspension mechanism in the ink composition system. The suspension mechanism can range from purely ionic repulsion to true emulsion formation. However, many factors enter into the stability of emulsions and they can "break" when there occurs a drop on demand (long inactivity between usages abbreviated DOD), for example upon evaporation of carrier/solvent, or chemical interaction of the ink composition components. A typical aqueous pigmented ink is disclosed in U.S. Pat. No. 5,221,334 to Ma et al of DuPont which is particularly directed to the use of block copolymer dispersants. The use of humectants in pigmented inks to resist ink jet nozzle clogging is shown in U.S. Pat. No. 5,106,417 to Hauser, et al of Ciba-Geigy.

Optical density is a measure of the coverage characteristics of an ink. With a given drop volume, optical density is an important indicator of how well the ink forms a crisply defined dot (or other image) with good opacity characteristics so that the light reflected from the printed image is that of the ink, yet not permitting partial show-through or see-through of the underlying media color, be it blank white paper or a previously printed media. Thus, it is an important goal to provide the highest optical density for the lowest pigment concentration so that the ink has good printing characteristics, that is handles well in the ink jet cartridges and produces a high quality image. As noted above, optical density can be improved by an increase in pigment concentration, but at the severe sacrifice of print-handling characteristics.

Optical density is measured by an optical densitometer after printing and letting dry multiple standard test blocks (½"×1") with a commercially available ink jet printer on commercially available copier paper at a defined dot pitch, typically 600×600, 600×300 or 300×300. Reflectance readings are taken by-the densitometer from multiple spaced locations from each test print block, and the optical density (reciprocal of reflectance) is the arithmetic average of the test point values. Crystallization or clogging by ink of orifices is determined by visual examination after an accelerated non-use period in which the cartridge is exposed to air without a cover over the jets for several hours, typically 10–48 hours, and which may be accelerated by heating to 100° F.

DISCLOSURE OF INVENTION

It is among the objects and advantages of this invention to provide ink jet inks having improved optical density characteristics while retaining excellent printability properties to produce high quality images.

Other objects and advantages of the invention include:

To improve the optical density properties of pigment-type inks, particularly of ink jet printer inks having normal or lower than normal pigment concentrations;

To provide a method for control and/or enhancement of optical density characteristics of standard ink formulations, particularly water-based inks for ink jet printers;

To provide improved optical density characteristics for dye-based inks while improving DOD characteristics and storage stability; and Other objects will be evidence from the detailed description, drawings and abstract hereof.

The present invention is directed to pigment-based aqueous ink formulations, in particular pigment-based aqueous inks used in ink jet printing, and to methods for improving the optical density of pigment-based inks. The inks of this invention comprise three principal components: a pigment component including one or more pigment-providing materials; a dispersant; end a water-based solvent system. Other agents may be included, such as humectants, pH control agents, emulsifiers, perfumes, anti-clogging agents, viscosity control or modifying agents, surface tension control agent, conductivity regulating agent, preservatives, biocides, surfactants, light stabilizers and the like. Such agents are well known in the art, some typical ones of which are disclosed in the aforesaid U.S. Pat. Nos: 5,106,417; 5,221,334; and 5,364,462, the disclosure of which is incorporated by reference herein.

The pigment component generally includes at least one insoluble particulate which has been classified to a narrow particulate size range. It is selected for its color, as well as other characteristics such as its ability to remain in suspension, resistance to agglomeration in the ink composition prior to application, ability to adhere to itself and the substrate surface, and its opacity or optical density when transferred to a substrate such as paper, metal, plastic, wood, glass, fabric, and the like. Carbon black, an amorphous or crystalline form of carbon produced commercially by thermal or oxidative decomposition of hydrocarbons, is usually selected when a black pigment is desired. Colored pigments include a cyan such as phthalocyanine blue, a yellow such as diaryl yellow, and a magenta such as DK napthol red. Other suitable pigments include those listed in columns 7 and 8 of U.S. Pat. No. 8,221.384, incorporated by reference herein.

The dispersant maintains the particulate pigment in suspension in the aqueous solvent and retards agglomeration of the pigment. Pigment and dispersant are often referred to in this field as "pigment dispersions," and the ratio of dispersant:pigment typically ranges from 1:3 to 3:1 in such compositions. While many dispersants suitable for this application are commercially available, a particularly suitable dispersant useful in the compositions of this invention is a styrene acrylate copolymer having an average molecular weight of approximately 9000 and is manufactured by SC Johnson Co., Racine, WI, under the tradename "Joncryl67."

Other suitable dispersants include AB or BAB block copolymers, or other polymers or copolymers, having a hydrophilic segment that hydrogen bonds to water and at least one other segment that kinks to, bonds with or associates with the pigment granule. Any other commercially available dispersants may be used. It should be understood, however, that with the advent of other types of carbon such as fullerenes, such carbons may be dispersable directly in water or a water/solvent system, with or without dispersants (s).

The solvent used in the inks of this invention include a water-based solvent system, which can be water (de-ionized water), or a mixture of DI water and at least one water soluble organic solvent. The solvent system components and proportions are application-specific, and typically include considerations of cartridge port (orifice) size, pigment/ dispersant system, drying time requirements, media type (substrate of paper, coated and uncoated, or plastic and the types of each), drop rate which involved surface tension and viscosity, pH and the like. Typical organic solvents comprise alcohols (including monohydric or polyhydric straight and branched chain alcohols), esters, ethers (including alkyl mono- or diethers), cyclic nitrogen compounds (such as pyrrolidones or imidazolidinones) and sulfoxy compounds (such as sulfoxides and sulfones).

Other preferred components of the ink formulations of this invention include a humectant or hygroscopic additive for moisture retention to prevent the ink from drying out inside of the ink cartridge from which it is dispensed. Humectants such as diethyleneglycol, n-methylpyrrolidone, and/or 2-pyrrolidone can be used either alone or in combination. As noted above, the 2-pyrrolidone has the added advantage of acting as a solvent for the dispersant, i.e. the strene acrylate copolymer. Concentration of the humectant additive may range from less than about 1% to about 75%, calculated as weight % of the total ink composition.

This invention is based on the discovery that the addition of organic quaternary ammonium compounds (OQA compounds) to an aqueous ink formulation as described above has the unexpected result of significantly improving the optical density of the ink as printed on a substrate. The OQA compounds of this invention providing the improved optical density have the general structure:

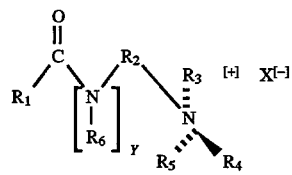

where:

R1 is hydroxy, or a $C_1$–$C_{22}$ alkyl, alkene or aryl radical, or $C_{10}$–$C_{22}$ alkyl, alkene, or aryl oxide radical;

$R_2$ is $C_1$–$C_5$ straight chain alkyls;

$R_3$, $R_4$ and $R_5$ are each $C_1$–$C_5$ straight or branched chain alkyls;

$R_6$ is H, or $C_1$–$C_3$ alkyls;

Y is 1 or 0; and

X is halide, hydroxide, sulfur-based, nitrogen-based, or phosphorous-based anion. Preferred exemplar OQAs are as shown in Table I below:

TABLE I

| Cation | R1 | R2 | R3–R5 | Y | X (anions) |
|---|---|---|---|---|---|
| acetamidopropyl trimethylammonium+ | $CH_3$— | —$(CH_2)_3$ | —$CH_3$ | 1 | $Cl^-$ |
| lactamidopropyl trimethylammonium+ | $(CH_2)_2CH$— | —$(CH_2)_3$ | —$CH_3$ | 1 | $Cl^-$ |
| betaine+ | OH— | —$CH_2$ | —$CH_3$ | 0 | $OH^-$ |
| babassuamidopropyl betaine+ | (C12—C18)—O— | —$(CH_2)_3$ | —$CH_3$ | 1 | $OH^-$ |
| cocamidopropyl betaine+ | (C17)—O— | —$(CH_2)_3$ | —$CH_3$ | 1 | $OH^-$ |
| behenyl betaine+ | (C22)—O— | —$CH_2$ | —$CH_3$ | 0 | $OH^-$ |

Preferred quaternary ammonium compounds resulting in improved optical print densities include quaternary acetamides such as lactamidopropyl trimethylammonium chloride, acetamidopropyl trimethylammonium chloride, cocamidopropyl betaine, behenyl betaine, and babassuamidopropylbetaine. Betaine, COOH—$CH_2$—N—$(CH_3)_3$—$OH^-$, also known as lycine, and its derivatives also result in improved optical densities over ink formulations not incorporating them. Betaine is a quaternary ammonium compound, and can be formed from a tertiary amine reacting with an alkyl halide, e.g., dimethyl glycine with methyl-chloride. The hydroxyl of the carboxyl moiety of this alpha amine can be replaced with a wide variety of substituents forming an acyl moiety, e.g., by acylating in alkaline solution with acid chlorides or acid alkydrides. Preferred are $C_1$–$C_{22}$ acyl substituents at the $R_1$ position (see structural formula). As noted with the quaternary acetamides, the carboxyl moiety may be replaced by an acetylamido moiety, $R_1O$—COHN where $R_1$ is $C_1$–$C_{22}$. For example, babassuamidopropyl betaine is a mixture of $R_1$=$(C_{12}$–$C_{18})$–$O^-$ (typically lauric, $C_{12}$, myristic, $C_{14}$, and oleic, $C_{18}$) moieties, while in cocamidopropyl betaine the moiety is $C_{17}$, and in behenyl betaine the moiety is $C_{22}$. The methylene ($CH_2$) group is replaced with a propyl group, that is R2=$(CH_2)_3$ in these amidopropyl betaines. These quaternary ammonium compounds are commercially available, e.g., from Aldrich Chemicals, or Croda, Inc., Parsippany, N.J. The acetamidopropyl trimethylammonium chloride is designated by Croda as Incromectant AQ™ and the lactarnido analog is designated by Croda as Incromectant LQ™, both at 75% activity. Croda offers the cocamidopropyl betaine as Incronam 30™, having 30% activity; behenyl betaine as Incronarn B-40™ having 40% activity; and babasuamidopropyl betaine as Incronam BA-30, having a 40% activity.

Other classes of compounds having structures similar to the substituted quaternary ammonium compounds, such as hydroxysultaines may be used. Hydroxysultaines have a sulfonate end group.

The organic quaternary ammonia compounds (OQA compounds) of this invention may be added to the ink formulation, or in the alternative, substituted for a portion of the solvent/solvent system and/or dispersant in the range of from 0.5 to 12 wt % of total composition, and preferably in the range of 2 to 5 wt %. Optical density is a unitless logarithmic scale so that a 0.1 improvement is very significant, and is easily visually discernable. The use of the OQA compounds of this invention show optical density improvements up to 0.5, which is more than a two-fold visual density improvement, that is, its resulting image is perceptibly twice as dense. Addition of the OQA compounds may be made after the ink has been prepared (without compromising its efficacy) or it may be added during preparation of the ink. Its ability to be added after an ink is has been prepared permits existing inventories of inks to be modified by the addition of the OQA compounds of this invention.

The invention also relates to the discovery that the addition of polyalkylene oxide (PAO), typically used as a viscosity control agent in ink formulations, in amounts ranging from about 0.0% to about 15% (weight percent) unexpectedly has a significant effect on the "drop rate," i.e., the rate of drop formation by which the ink is deposited onto the substrate, with 0% having no effect. The preferred PAO is polyethylene oxide, typically polyethylene glycol (PEG). By changing the molecular weight of the polyethylene oxide, the ink drop rate can be "tuned" to match the frequency of the jet, thus significantly increasing the rate at which characters may be written by the ink jet. An improvement of from about 3000 drops/see to a rate of about 8000 drops/sec has been achieved. Unexpectedly, this phenomenon is counter-intuitive, in that the drop rate increase occurs in direct relation to the PAO molecular weight (weight average molecular weight, $M_w$). That is, as the PAO $M_w$, increases, rather than the drop rate decreasing due to greater viscosity, the drop rate increases. Further, there appears to be a synergy between PAO and OQA compound since use of OQA alone enhances optical density less than compared to use of PAO plus OQA.

A further important aspect of the invention is the discovery that the addition of urea, urea derivatives or urea-evolving compounds in an amount ranging from about 0% to about 12% (weight %) unexpectedly keeps the ink from solidifying or otherwise clogging the ink jet orifices, e.g., by forming a varnish or "paint-like", build-up with 0% having no effect.

Thus, the invention covers the use separately or in combination of one or more of the defined class of organic quaternary ammonium compounds, PAO, and urea in a single ink formulation to provide an improved water-based ink formulation having high optical density, high drop rate, and anti-clogging characteristics. In this regard, an important aspect of the invention is the fact that adding one or more of these components to commercially available inks of others results in significantly improved optical density, reduction in orifice plugging and/or increase in drop rate.

BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

A series of inks were prepared as indicated in the tables associated with each of the respective Examples 1–9 below in which the amounts of OQA compounds, urea and PAO, in weight percent, were varied along with standard ink components and compared to controls for optical density. As indicated, in some Examples the OQA compounds, urea and/or PAO were simply added to the ink composition, resulting in a simple dilution, and in other Examples these components were replacements for the component(s) listed in the table of the respective Example. This illustrates that the OQA compounds can be used to enhance commercially available ink by simple addition without adversely affecting the print properties of the ink, yet vastly improving the optical density and the visual impact of the print. In the first six Examples presented below, the effect of the addition of 4–6% by weight of Croda AQ (75% acetamidopropyl trimethylamminium chloride), Croda LQ (75% lactamidopropyl trimethyl ammonium chloride), and betaine on a black pigmented water-based ink is investigated. All experimental inks were run against control inks not including the quaternary ammonium compounds. All inks contain approximately 4.7% polyethylene oxide to enhance drop rate, and 8.6% urea to eliminate gumming of the ink jet.

The optical density test procedure is as follows: All printing, for direct companion, was a Xerox brand 4200 DP 20 lb. copier paper, Xerox part #31:12047, felt side up in the tray so that upon path reversal the printing occurs on the wire side, except as where indicated in the Examples. (Xerox 4204 paper is printed on the felt side.) The inks were loaded into clean, triple rinsed Hewlett Packard ink jet cartridges, Models HP 51608A, 51633A, 51629A or 51626A, the appropriate cartridge being used for the appropriate HP printer and ink (black or color). The printers were Hewlett Packard Desk Jet™ series printers; models 660C (for 600 dpi tests), 560C and 500C. The software was Microsoft G.W Basic, and the densitometer was a MacBeth Model FD917.

The ink compounded pursuant to each example below was loaded into an appropriate "virgin" test cartridge using the manufacturers' refill instructions. A virgin cartridge is one which has been emptied of its original or test ink by printing until jet starve, and then rinsed clean with deionized water. After filling the cartridge with the test ink or control ink, the cartridge is loaded in the printer following the manufacturer's instructions, and the printer test pattern is run per manufacturer's instructions to verify all jets are properly operating. In the event any numbers in the printer test pattern indicate there are any electrical disconnects, the contacts are cleaned and the cartridge re-tested and the priming/cleaning cycle run to free any temporarily clogged or air-bound jets until a clean test pattern is produced. Several pages of black test pattern can be run to verify. If the cartridge is still not operating properly, it is discarded and a replacement readied. All test results reported herein were run with cartridges that passed this "ready" test.

The Zerox 4200DP paper is then placed in the printer tray felt side up, so that upon printing the paper side is reversed to print on the wire side. The wire side is identified as the side facing upward when the package is opened with its seam up. This is normally indicated by the manufacturer with an arrow, with the "up" arrow direction being the wire side. 100 pages are printed in the ½"×1" block test pattern for the 51626A and 51629A cartridges and 50 pages for the smaller 51608A and 51633A cartridges. The last 10 pages of each print run are set aside for densitometer testing.

The densitometer is set up per manufacturer's instructions, allowing a minimum of 30 minutes for warm up. The densitometer is calibrated using the appropriate test plate and "white" filter provided. Recalibration is done after each 12 measurements or 15 minutes, whichever comes first. The prints are allowed to dry at ambient temperatures for 1 hour. The density is measured on three sequential test blocks in a standard test pattern as follows:

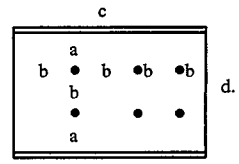

Where a=⅛", b=¼", and d=½". The optical density is reported as the arithmetic average of the 18 measurements (6 locations in each of 3 sequential test blocks). Additional references for printers/printing are: 1) Hewlett Packard Acceptance Criteria for the HP Desk Jet 500C Printer, end 2) Bares, S. J., "Printing on Plain Paper with a Thermal Ink Jet Printer," Hewlett Packard Journal, Vol. 39, No. 6, Dec. 1988.

EXAMPLE 1: Effect of 4% acetamidopropyl trimethylammonium chloride (Croda AQ)

An experimental ink was prepared with approximately 4% of Croda AQ (75% active in acetamidopropyl trimethylammonium chloride) included in the composition. First a control ink was prepared with diethylene glycol was added as a humectant end 2-pyrrolidone added as a humectent end as a solvent for the styrene acrylate copolymer. Polyethylene oxide was added to impedence match the ink with the ink jet drop rate. The 4% by weight of Croda AQ was added to en aliquot of the control ink to form the experimental ink. The parameters end values for the ink compositions, as well as the results of optical density testing are presented below.

| | CRODA AQ (4%) | |
|---|---|---|
| PIGMENT DISPERSION | EXPERIMENTAL | CONTROL |
| Pigment (Carbon black) | 30 | 30 |
| Dispersant (Styrene acrylate) | 20 | 20 |
| Water | 50 | 50 |
| Weight Percent of Total | 8.20 | 8.20 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| Urea | 8.60 | 8.60 |
| Croda AQ | 4.00 | 0.00 |
| Deionized Water | 67.80 | 67.80 |
| RESULTS | | |
| pH | 9.30 | 9.30 |
| Viscosity | 1.10 | 1.10 |
| Surface Tension (dynes/cm) | 48 | 48 |
| Optical Density | 1.57 | 1.22 |
| Print Sharpness | Excellent | Fair |

Note:
Printer is HP660C at 600 dpi; print frequency is 8000 drops/sec.
Paper is Xerox 4200 copypaper. Printing performed on the wire side.
Introduction of Croda AQ (75% active) by simple addition (i.e., dilution) to ink.

The optical density and print sharpness results clearly show that the addition of 4% Croda AQ after the ink has been prepared results in a significant and surprising improvement in optical density of the print of 0.35. The experimental ink jetted well with no jet face build-up.

EXAMPLE 2: Effect of 6% acetamidopropyl trimethylammonium chloride (Croda AQ)

As in the first Example, an experimental ink was manufactured with approximately 6% of Croda AQ added to an aliquot of the control ink composition. Humectants, dispersing agent solvents and an impedence matcher were added as in Example 1. The control ink does not contain Croda AQ. The parameters and values for the ink compositions, as well as the results of optical density testing are presented below.

| CRODA AQ (6%) | | |
|---|---|---|
| PIGMENT DISPERSION | EXPERIMENTAL | CONTROL |
| Pigment (Carbon black) | 30.00 | 30.00 |
| Dispersant (Styrene acrylate) | 20.0 | 20.00 |
| Water | 50.00 | 50.00 |
| Weight Percent of Total | 8.20 | 8.20 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| Urea | 8.60 | 8.60 |
| Croda AQ (75% acetamidopropyl trimethylammonium chloride) | 6.00 | 0.00 |
| Deionized Wtaer | 67.80 | 67.80 |
| RESULTS | | |
| pH | 9.30 | 9.30 |
| Viscosity | 1.10 | 1.10 |
| Surface Tension (dynes/cm) | 48 | 48 |
| Optical Density | 1.50 | 1.22 |
| Print Sharpness | Good | Fair |

Note:
Printer is HP660C at 600 dpi; print frequency is 8000 drops/sec.
Paper is Xerox 4200 copypaper. Printing performed on the wire side.
Introduction of Croda AQ (75% active) is by simple addition (i.e., dilution) to ink.

Optical density of the experimental ink is still well above that of the control ink at 0.22 greater density. However, the optical density of the 6% Croda ink sample is slightly less that the optical density of the 4% ink sample in Example 1, thus suggesting that 4% Croda AQ may be optimal as compared to to the 6% concentration. While print sharpness is still better than the control, the 6% Croda AQ ink sample did not produce characters that were quite as sharp as the 4% Croda AQ ink samples. No jet face build-up was observed.

Examples 1 and 2 suggest that that a 4% concentration of added Croda AQ is preferred to a 6% contraction of Croda AQ. While the addition of both increased the optical density of the ink well above that of the controls, the 4% Croda AQ produced slightly better results.

EXAMPLE 3: Effect of 4% lactamidopropyl trimethylammonium chloride (Croda LQ)

An experimental ink was prepared by the procedure of Examples 1 and 2 with approximately 4% of Croda LQ included in the composition. Croda LQ differs from Croda AQ in that a 2-propyl group is substituted for the methyl group on the carbonyl carbon. Humectants, dispersant solvents and impedence marcher were included in the experimental and control ink formulations as in the previous two Examples. The control ink was manufactured concurrently without including Croda LQ in the composition. The parameters and values for the ink compositions, as well as the results of optical density testing are presented below.

| CRODA LQ (4%) | | |
|---|---|---|
| PIGMENT DISPERSION | EXPERIMENTAL | CONTROL |
| Pigment (Carbon black) | 30 | 30 |
| Dispersant (Styrene acrylate) | 20 | 20 |
| Water | 50 | 50 |
| Weight Percent of Total | 8.20 | 8.20 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| Urea | 8.60 | 8.60 |
| Corda LQ | 6.00 | 0.00 |
| Deionized Water | 67.80 | 67.80 |
| RESULTS | | |
| pH | 9.30 | 9.30 |
| Viscosity | 1.10 | 1.10 |
| Surface Tension (dynes/cm) | 48 | 48 |
| Optical Density | 1.57 | 1.22 |
| Print Sharpness | Excellent | Fair |

Note:
Printer is HP660C at 600 dpi; print frequency is 8000 drops/sec.
Paper is Xerox 4200 copypaper. Printing performed on the wire side.
Introduction of Croda LQ is by simple addition (i.e., dilution) to ink.

As in the 4% Croda AQ Example 1, the optical density is very high, and at 0.35 is significantly higher than the control. The substitution of Croda LQ for Croda AQ does not appear to adversely affect the amount of improvement in optical density. The results of the above 3 examples suggest that either Croda AQ or Croda LQ may be used, and that a 4% addition is preferred to a 6% addition of the OQA compounds.

The next two Examples explore the use of betaine as an optical density enhancing agent. Betaine is a quaternary ammonium compound having a hydroxy or a fatty acid group attached to the carbonyl carbon.

EXAMPLE 4: Effect of 2% Betaine on Optical Density

An experimental ink was prepared by the procedure above with approximately 2 % betaine included in the experimental composition. Diethylene glycol was used as a humectant, 2-pyrrolidone was used as a humectant and as a solvent for the styrene acrylate copolymer, and polyethylene oxide (PEO) was added to impedence match the ink with the ink jet drop rate. 2% by weight of betaine was added to the experimental ink aliquot. The control ink aliquot does not include betaine in the composition. The parameters and values for the ink compositions, as well as the results of optical density testing are presented below.

| BETAINE 2% | | |
|---|---|---|
| PIGMENT DISPERSION | EXPERIMENTAL | CONTROL |
| Pigment (Carbon black) | 30 | 30 |
| Dispersant (Styrene acrylate) | 20 | 20 |
| Water | 50 | 50 |
| Weight Percent of Total | 8.20 | 8.20 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| Urea | 8.60 | 8.60 |
| Betaine | 2.00 | 0.00 |
| Deionized Water | 67.80 | 67.80 |
| RESULTS | | |
| pH | 9.30 | 9.30 |

-continued

| BETAINE 2% | | |
|---|---|---|
| PIGMENT DISPERSION | EXPERIMENTAL | CONTROL |
| Viscosity | 1.2 | 1.2 |
| Surface Tension (dynes/cm) | 48 | 48 |
| Optical Density | 1.35 | 1.22 |
| Print Sharpness | Excellent | Fair |

Note:
Printer is HP
Paper is Xerox 4200 copypaper. Printing performed on the wire side.
Introduction of betaine is by simple addition (i.e., dilution) to ink.

Print sharpness and optical density of the experimental ink using betaine is significantly improved over the control ink.

EXAMPLE 5: Effect of 4% Betaine on Optical Density

As above, an experimental ink was prepared with approximately 4% of betaine included in the composition. Diethylene glycol was used as a humectant, 2-pyrrolidone was used as a humectant and as a solvent for the styrene acrylate copolymer, and polyethylene oxide was added to impedence match the ink with the ink jet drop rate. 4% by weight of betaine was added to the experimental ink aliquot after it had been prepared. The control ink aliquot does not contain betaine. The parameters and values for the ink compositions, as well as the results of optical density testing are presented below.

| BETAINE 4% | | |
|---|---|---|
| PIGMENT DISPERSION | EXPERIMENTAL | CONTROL |
| Pigment (Carbon black) | 30 | 30 |
| Dispersant (Styrene acrylate) | 20 | 20 |
| Water | 50 | 50 |
| Weight Percent of Total | 8.20 | 8.20 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| Urea | 8.60 | 8.60 |
| Betaine | 4.00 | 0.00 |
| Deionized Water | 67.80 | 67.80 |
| RESULTS | | |
| pH | 9.30 | 9.30 |
| Viscosity | 1.20 | 1.10 |
| Surface Tension (dynes/cm) | 48 | 48 |
| Optical Density | 1.35 | 1.22 |
| Print Sharpness | Excellent | Fair |

Note:
Printer is HP660C at 600 dpi; print frequency is 8000 drops/sec.
Paper is Xerox 4200 copypaper. Printing performed on the wire side.
Introduction of betaine is by simple addition (i.e., dilution) to ink.

Print sharpness and optical density of the experimental ink using betaine is excellent and substantially improved over the control ink formulation. The optical density of the experimental ink did not improve in going from a 2% betaine formulation to a 4% betaine formulation.

Examples 6, 7 and 8 investigate the effect of 4% Croda AQ on a colored pigment ink formulation.

EXAMPLE 6: Effect of 4% Croda AQ on a Cyan Colored Pigmented Ink

An experimental ink was manufactured with approximately 4% of Croda AQ included in the composition. The formulation for this ink included a cyan colored pigment instead of a carbon black pigment. Diethylene glycol was added as a humectant, 2-pyrrolidone was added as a humectant and as a solvent for the styrene acrylate copolymer, and polyethylene oxide was added to impedence match the ink with the ink jet drop rate. A 4% by weight of Croda AQ was added to the experimental ink during its preparation. A control ink was manufactured concurrently. The parameters and values for the ink compositions, as well as the results of optical density testing are presented below.

| CYAN COLORED PIGMENT W/CRODA AQ (4%) | | |
|---|---|---|
| PIGMENT DISPERSION | EXPERIMENTAL | CONTROL |
| Pigment (Carbon black) | 23 | 23 |
| Dispersant (Styrene acrylate) | 17 | 17 |
| Water | 60 | 60 |
| Weight Percent of Total | 8.50 | 8.50 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| Urea | 8.60 | 8.60 |
| Croda AQ | 4.00 | 0.00 |
| Deionized Water | 63.80 | 67.80 |
| RESULTS | | |
| pH | 9.40 | 9.40 |
| Viscosity | 1.20 | 1.20 |
| Surface Tension (dynes/cm) | 46 | 46 |
| Optical Density | 1.53 | 1.26 |
| Print Sharpness | Bright (compared to control) | Muted |

Note:
Printer is HP560C at 300 dpi; print frequency is 3000 drops/sec.
Paper is HP CX copypaper. Printing performed on the wire side.
Introduction of Croda AQ is by substitution of 4% w/w deionized water.

As in Example 1, the optical density of the 4% Croda AQ experimental ink was significantly higher than the optical density of the control ink formulation. Also, as in Example 1, the print sharpness of the 4% Croda AQ formulation was improved over that of the control ink formulation.

EXAMPLE 7: Effect of 4% Creda AQ on a Yello Colored Pigmented Ink

An experimental ink was manufactured with approximately 4% of Croda AQ included in the composition. The formulation for this ink included a yellow colored pigment instead of a carbon black pigment. Diethylene glycol was added as a humectant, 2-pyrrolidone was added as a humectant and as a solvent for the styrene acrylate copolymer, and polyethylene oxide was added to impedence match the ink with the ink jet drop rate. A 4% by weight of Croda AQ was added to the experimental ink during its preparation. A control ink was manufactured concurrently. The parameters and values for the ink compositions, as well as the results of optical density testing are presented below.

| YELLOW COLORED PIGMENT W/CRODA AQ (4%) | | |
|---|---|---|
| PIGMENT DISPERSION | EXPERIMENTAL | CONTROL |
| Pigment (Carbon black) | 23 | 23 |
| Dispersant (Styrene acrylate) | 17 | 17 |
| Water | 60 | 60 |
| Weight Percent of Total | 8.80 | 8.80 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |

-continued

| YELLOW COLORED PIGMENT W/CRODA AQ (4%) | | |
|---|---|---|
| PIGMENT DISPERSION | EXPERIMENTAL | CONTROL |
| 1 N Ammonium Hydroxide | 1.50 | 1.50 |
| Urea | 8.60 | 8.60 |
| Croda AQ | 4.00 | 0.00 |
| Deionized Water | 63.40 | 67.40 |
| RESULTS | | |
| pH | 9.30 | 9.30 |
| Viscosity | 1.10 | 1.10 |
| Surface Tension (dynes/cm) | 48 | 48 |
| Optical Density | 1.10 | 0.95 |
| Print Sharpness | Bright (compared to control) | Muted |

Note:
Printer is HP560C at 300 dpi; print frequency is 3000 drops/sec.
Paper is HP CX copypaper. Printing performed on the wire side.
Introduction of Croda AQ is by substitution of 4% w/w D.I. water.

While print sharpness continues to remain significantly improved over that of the control, the improvement in optical density of the 4% Croda AQ formulation is not as great as was seen in the cyan color pigmented Example 6, although the 0.05 difference in optical density is still visually discernible.

EXAMPLE 8: Effect of 4% Croda AQ on a Magenta Color Pigmented Ink

An experimental ink was manufactured with approximately 4% of Croda AQ included in the composition. The formulation for this ink included a magenta colored pigment instead of a carbon black pigment. Diethylene glycol was added as a humectant, 2-pyrrolidone was added as a humectant and as a solvent for the styrene acrylate copolymer, and polyethylene oxide was added to impedence match the ink with the ink jet drop rate. 4% by weight of Croda AQ was added to the experimental ink during its preparation. A control ink was manufactured concurrently. The parameters and values for the ink compositions, as well as the results of optical density testing are presented below.

| MAGENTA COLORED PIGMENT W/CRODA AQ (4%) | | |
|---|---|---|
| PIGMENT DISPERSION | EXPERIMENTAL | CONTROL |
| Pigment (DK-Napthol red) | 26 | 26 |
| Dispersant (Styrene acrylate) | 14 | 14 |
| Water | 60 | 60 |
| Weight Percent of Total | 8.20 | 8.20 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| 1 N Ammonium hydroxide | 2.5 | 2.5 |
| Urea | 8.60 | 8.60 |
| Croda AQ | 6.00 | 0.00 |
| Deionized Water | 60.80 | 64.80 |
| RESULTS | | |
| pH | 9.30 | 9.30 |
| Viscosity | 1.20 | 1.20 |
| Surface Tension (dynes/cm) | 46 | 46 |
| Optical Density | 1.38 | 1.22 |
| Print Sharpness | Bright (compared to control) | Muted |

Note:
Printer is HP560C at 300 dpi; print frequency is 3000 drops/sec.
Paper is HP CX copypaper. Printing performed on the wire side.
Introduction of Croda AQ is by substitution of 4% w/w deionized water.

Both optical density and print sharpness of the experimental 4% Croda formulation are significantly improved over the results obtained from the control formulation. Note that the optical density of the experimental formulation has increased over that observed for the yellow dye.

EXAMPLE 9: Effect of Urea on Optical Density and Print Sharpness

Urea has been added to all of the formulations in the above Examples 1–8 inthat it was discovered that its use in an ink jet ink formulation prevented the ink jet from gumming-up. An experimental ink was manufactured with urea removed from the composition. In the first experimental formulation, the Urea was simply not added. In the second formulation, the urea was replaced with deionized water. 4% Croda AQ was added to both formulations. Both formulations are identical to the 4% Croda AQ formulation of Example 1 with the exception of the UREA and with the exception that formulation two has replaced the urea with water. The formulation for these inks included a carbon black pigment. Diethylene glycol was added as a humectant, 2-pyrrolidone was added as a humectant and as a solvent for the styrene acrylate copolymer, and polyethylene oxide was added to impedence match the ink with the ink jet drop rate. No control ink was manufactured, however, the results may be compared to the control formulation associated with Example 1. The parameters and values for the ink compositions, as well as the results of optical density testing are presented below.

| EFFECT OF UREA | | |
|---|---|---|
| PIGMENT DISPERSION | UREA Removed from Formulation | UREA Replaced by D.I. Water in Formulation |
| Pigment (Carbon black) | 30 | 30 |
| Dispersant (Styrene acrylate) | 20 | 20 |
| Water | 50 | 50 |
| Weight Percent of Total | 8.20 | 8.20 |
| PIGMENT INK FORMULATION | | |
| Diethylene Glycol | 8.90 | 8.90 |
| 2-Pyrrolidone | 1.70 | 1.70 |
| Polyethylene Oxide | 4.70 | 4.70 |
| Molecular Weight | 5000 | 5000 |
| Urea | — | — |
| Croda LQ | 6.00 | 0.00 |
| Deionized Water | 67.80 | 76.40 |
| RESULTS | | |
| pH | 9.70 | 9.70 |
| Viscosity | 1.10 | 1.10 |
| Surface Tension (dynes/cm) | 48 | 48 |
| Optical Density | 1.57 | 1.57 |
| Print Sharpness | Excellent | Excellent |
| Other Comment | Gum build-up on jet after 30 pages. | Gum build-up on jet after 51 pages. |

Note:
Formulations are
Printer is HP660C at 600 dpi; print frequency is 8000 drops/sec.
Paper is Xerox 4200 copypaper. Printing performed on the wire side.
Introduction of Croda LQ is by simple addition (i.e., dilution) to ink.

In both case the optical density is excellent and significantly improved over the control formulation of Example 1. Print sharpness is also excellent. No differences in the values of these parameters could be discerned as between whether the urea is simply removed or is replaced by deionized water. We can conclude that optical density and print sharpness do not depend on urea being present in the formulation. However, without the urea, the ink jet nozzles became gummed-up quite quickly. In the case where the urea was simply removed from the formulation, the ink jet became gummed-up after only 30 sheets. Replacing the urea with deionized water extended the nozzle utility, but it still became gummed-up after only 51 sheets.

EXAMPLE 10 PAO Tuning

An ink of Example 1 (Experimental) was prepared but with PEO of 600 Mw and compared to the Example 1 ink where PEO had a 5000 Mw. The Example 10 ink performed well at 4000 drops/sec, but was clearly mismatched at 8000 drops/sec. In contrast, at the higher Mw of 5000, the ink performed excellently without mismatch at 8000 drops/sec. Thus, by control of the ink PAO molecular weight, the printer drop rate production can be matched in the range of up to about 12,000 drops/sec.

INDUSTRIAL APPLICABILITY:

The industrial applicability of the ink formulations and methods of this invention are self-evident. The improvements in optical density and print sharpness exhibited by the ink formulations of this invention clearly find applicability in providing inks capable of smaller higher print densities and enhanced readability. Also, the presence of urea in these formulations provides inks for ink jets that do not gum-up the ink jet after printing a few sheets.

It should be understood that various modifications within the scope of this invention can be made by one of ordinary skill in the art without departing from the spirit thereof. Therefore wish invention to be defined by the scope of the appended claims as broadly as the prior art will permit, and in view of the specification if need be.

I claim:

1. An aqueous pigment-based ink jet ink composition having improved optical density and print sharpness, comprising:

a) a water-based carrier medium;
   b) pigment particles stabilized by a dispersing agent; and
   c) an optical density enhancer, said optical density enhancer is selected from the group consisting of hydroxy sultaines, quaternary ammonium compounds, and solutions of quaternary ammonium compounds, said quaternary ammonium compounds having the general structure:

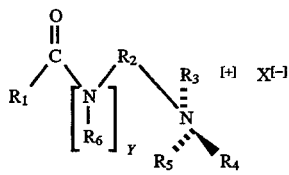

wherein:

i) $R_1$ is selected from the group consisting essentially of a hydroxyl radical; $C_1$–$C_{22}$ alkyl, alkene or aryl radical; and $C_{10}$–$C_{22}$ alkyl, alkene or aryl oxide radical;
   ii) $R_2$ is selected from the group consisting essentially of linear alkyls having from about one to about five carbons;
   iii) $R_3$, $R_4$, and $R_5$ are selected from the group consisting of linear alkyls, and branched alkyls having from about one to about five carbons;
   iv) $R_6$ is selected from the group consisting essentially of H, $C_1$–$C_3$ alkyls, and $C_1$–$C_3$ alkenes;
   v) Y is 1 or 0; and
   vi) X is selected from the group consisting of halide anions, hydroxyl radical, sulfur-based anions, nitrogen-based anions, and phosphorus-based anions.

2. An ink jet ink composition as in claim 1 wherein said water-based carrier medium comprises water, a water/water-soluble organic solvent medium, and at least one humectant.

3. An ink jet ink composition as in claim 2 wherein said water soluble organic solvent is 2-pyrrolidone.

4. An ink jet ink composition as in claim 2 wherein said humectants are selected form the group consisting essentially of diethylene glycol, 2-pyrrolidone and n-methyl pyrrolidone.

5. An ink jet ink composition as in claim 1 wherein said dispersing agent is a polymer-based dispersing agent.

6. An ink jet ink composition as in claim 4 wherein said polymer-based dispersing agent is a styrene acrylate copolymer.

7. An ink jet ink composition as in claim 1 further comprising a polyalkylene oxide.

8. An ink jet ink composition as in claim 7 wherein said polyalkylene oxide is polyethylene oxide.

9. An improved aqueous pigment-based ink for ink-jets including a water based-based carrier medium, a dispersing agent, water soluble organic solvent, a pigment or pigment-dye and at least one humectant wherein the improvement comprises:

a) an optical density enhancer comprising an organic quaternary ammonium compound in the range of from about 0.5% to about 12% by weight of total composition, said optical density enhancer having the general structure:

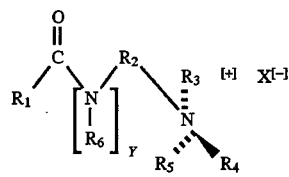

wherein:

i) $R_1$ is selected from the group consisting essentially of hydroxyl radical; $C_1$–$C_{22}$ alkyl, alkene or aryl radical; and $C_{10}$–$C_{22}$ alkyl, alkene or aryl oxide radical;
   ii) $R_2$ is selected from the group consisting essentially of linear alkyls having from about one to about five carbons;
   iii) $R_3$, $R_4$, and $R_5$ are selected from the group consisting of linear alkyls, and branched alkyls having from about one to about five carbons;
   iv) $R_6$ is selected from the group consisting essentially of H, $C_1$–$C_3$ alkyls, and $C_1$–$C_3$ alkenes;
   v) Y is 1 or 0; and
   vi) X is selected from the group consisting of halide anions, hydroxyl radical, sulfur-based anions, nitrogen-based anions, and phosphorus-based anions;
   b) a polyalkylene oxide in the range from about 0% to about 15% by weight of total composition, matching the ink to the ink jet drop formation rate; and
   c) an ink jet antifouling agent in the range of from about 0.0% to about 12% by weight of total composition, said ink jet antifouling agent is selected from urea, urea derivatives, and thiol derivatives.

10. An improved aqueous pigment based ink as in claim 9 wherein said optical density enhancer is selected from the group consisting of acetamidopropyl-trimethylammonium halide, lactamidopropyl-trimethylammonium halide, behenyl betaine, betaine, cocamidopropyl betaine, and babassuamidopropyl betaine.

11. An improved aqueous pigment-based ink as in claim 9 wherein said polyalkylene oxide is polyethylene oxide.

12. A method for making an ink jet ink having improved optical and print sharpness, the steps comprising:

a) providing an aqueous pigment-based ink, and b) adding an optical density enhancer to said aqueous pigment-based ink, said optical density enhancer having the general structure:

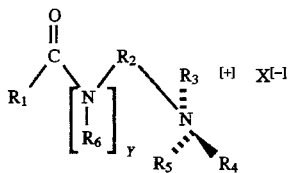

wherein i) $R_1$ is selected from the group consisting essentially of hydroxyl radical; $C_1$–$C_{22}$ alkyl, alkene or aryl radical; and $C_{10}$–$C_{22}$ alkyl, alkene or aryl oxide radical;

ii) $R_2$ is selected from the group consisting essentially of linear alkyls having from about one to about five carbons;

iii) $R_3$, $R_4$, and $R_5$ are selected from the group consisting of linear alkyls, and branched alkyls having from about one to about five carbons;

iv) $R_6$ is selected from the group consisting essentially of H, $C_1$–$C_3$ alkyls, and $C_1$–$C_3$ alkenes;

v) Y is 1 or 0; and vi) X is selected from the group consisting of halide anions, hydroxyl radical, sulfur-based anions, nitrogen-based anions, and phosphorus-based anions.

13. A method of making an ink jet ink as in claim 12 wherein said organic quaternary ammonium compound is selected from the group consisting of acetamidopropyl trimethylammonium halide, lactamidopropyltrimethylammonium, betaine, cocamidopropylbetaine, behenylbetaine, and babassuamidopropyl betaine.

* * * * *